United States Patent Office 2,842,580
Patented July 8, 1958

2,842,580

CLEAVAGE OF ORGANOHALOGENOPOLYSILANES WITH QUATERNARY AMMONIUM OR PHOSPHONIUM HALIDES

Alfred R. Gilbert and Glenn D. Cooper, Schenectady, N. Y., assignors to General Electric Company, a corporation of New York No Drawing. Application November 22, 1955
Serial No. 548,548

6 Claims. (Cl. 260—448.2)

This invention relates to the cleavage of organohalogenopolysilanes and the preparation of organic compounds of silicon, particularly organohalogenomonosilanes. More particularly, this invention is concerned with the method which comprises heating an organohalogenopolysilane containing a silicon-silicon linkage at an elevated temperature in the presence of a member selected from the class consisting of quaternary ammonium halides and quaternary phosphonium halides so as to cleave the silicon-silicon bond, thereby to obtain a material of low molecular weight, and in particular an organohalogenomonosilane in which the four valences of silicon are satisfied by organo and halogeno radicals.

As used herein, the term "organohalogenopolysilane," for instance, an organohalogenodisilane, is intended to mean organic compounds containing the unit structure (1) 

where Z is an organic radical, and at least one of the silicon atoms in the polysilane chain contains a silicon-bonded halogen atom, e. g., chlorine, bromine, fluorine, etc., the other valences of the silicon atom being satisfied by members selected from the class consisting of an organic radical, e. g., methyl, ethyl, propyl, isopropyl, phenyl, xylyl, benzyl, chlorophenyl, chloroxylyl, etc.; halogen, e. g., chlorine, bromine, fluorine, etc.; and another silicon atom. Polysilicon compounds containing a plurality (i. e. at least 2) of adjacent silicon atoms are described in Mohler et al. Patent 2,598,435, issued May 27, 1952, and in Burkhard Patent 2,554,976, issued May 29, 1951, both patents being assigned to the same assignee as the present invention.

One of the objects of this invention is to provide a rapid method for degrading organohalogenopolysilanes to organohalogenomonosilanes.

Another object of the invention is to produce alkyl halogenomonosilanes in which the four valences of silicon are satisfied by alkyl and halogen radicals.

Organohalogenopolysilanes, for instance organohalogenodisilanes, have been shown to be capable of cleavage to monosilanes. However, many of the previous methods for effecting this degradation from the polysilane to the monosilane state have not been satisfactory because, in the first place, the yields of desirable products have been poor, and in the second place the experimental conditions for this conversion have been difficult to carry out and have required extremely high temperatures and accordingly expensive pressure equipment. Another method for effecting the degradation from a polysilane to the monosilane state, specifically the method described and claimed in Bluestein Patent 2,709,176, issued May 24, 1955, and assigned to the same assignee as the present invention, provides a quick, low cost method for degradation of the polysilane to the monosilane state, but the method described by Bluestein is advantageous in operations where it is desired to have the hydrogen content of the silane greater than the hydrogen content of the polysilanes. However, his process is not applicable where it is desired to have the hydrogen content of the silane less than that of the polysilane. Thus, by the method of the Bluestein patent, the organohalogenopolysilanes are cleaved by a reaction between a tertiary amine and hydrogen chloride. The use of hydrogen chloride (as a gas or as an amine hydrochloride salt) causes cleavage of the polysilane but also adds both hydrogen and chloride radicals to the resulting monosilane. For many applications, it is desirable that the resulting silane contain no silicon-bonded hydrogen atoms. For example, when preparing the so-called "silicone" molding resins, insulating elastomers, and lubricating fluids, it is preferable that the resulting silicones contain no silicon-bonded hydrogen atoms. By the Bluestein et al. process, the monosilanes formed contain these silicon-bonded hydrogen atoms and thus the resins, elastomers, and fluids prepared from the silane mixtures produced by the method of the Bluestein patent would contain silicon-bonded hydrogen atoms.

We have now discovered that the organohalogenopolysilanes of the type previously described can be readily cleaved to organohalogenomonosilanes, even at relatively mild temperatures. This cleavage ruptures the silicon-silicon bonds to yield organosilicon compounds, the molecular weight of which are lower than those of the starting organohalogenopolysilanes.

Our invention is particularly applicable to the treatment of individual organodisilanes or higher boiling fractions comprising a mixture of organodisilanes corresponding to the general formula (2) $$Si_2X_n(R)_{6-n}$$

where R is a monovalent hydrocarbon or halogenated, e. g., chlorinated hydrocarbon radical, for instance an alkyl, aryl, aralkyl, chlorinated aryl, etc. radical, X is halogen, for instance, chlorine, bromine, fluorine, etc., and $n$ is an integer equal to from 1 to 5, inclusive. Such disilane compositions of matter are obtained usually during the passage of hydrocarbon halides over heated silicon, preferably in the presence of a catalyst in accordance with the disclosures and teachings of Rochow Patent 2,380,995, issued August 7, 1945, and assigned to the same assignee as the present invention. In addition to the usual organohalogenomonosilanes obtained, mixtures of organohalogenodisilanes corresponding to the above formula are also obtained, as well as small amounts of organohalogenopolysilanes containing more than two silicon atoms joined to each other by silicon-silicon linkages.

A more specific type of high boiling residue consisting for the most part of methylchlorodisilanes (obtained by the passage of methyl chloride over silicon and copper in accordance with the above-mentioned Rochow patent) comprises compositions having the general formula (3) 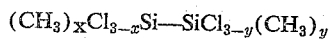

where $x$ is a whole number equal to from 0 to 3 and $y$ is a whole number equal to from 0 to 3 and the sum of $x+y$ is equal to at least one and generally between 2 and 4. As a result of the reaction between methylchloride and silicon described above, about 70 to 85 percent of the product other than the monosilanes and materials boiling below dimethyldichlorosilane comprise the above-described methylchlorodisilanes, the remainder of the high boiling residue being a mixture of methylchlorosilanes and silylmethylene compounds having the unit (4) 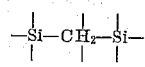

Although these organohalogenopolysilanes have some uses, for instance as priming agents for the purpose disclosed in Smith-Johannsen Patent 2,575,141 or as minor modifying agents in the manufacture of silicone oils and resins, their utility is limited. Accordingly, it has been desirable to find a method for a ready degradation of these organohalogenopolysilanes to more useful monosilanes in which the four valences of silicon are satisfied by methyl and chloro radicals, for instance, methyltrichlorosilane, dimethyldichlorosilane, trimethylchlorosilane, these degradation products being useful as previously described in the preparation of organopolysiloxane resins, elastomers, and fluids.

All the above objects and the desirable results recited above can now be accomplished by treating the above organohalogenopolysilane or mixture of organohalogenopolysilanes with a member selected from the class consisting of quaternary ammonium halide or a quaternary phosphonium halide.

Although we do not wish to be bound by theoretical considerations, we believe that the process of the present invention proceeds by a disproportionation of the organohalogenopolysilane to an organohalogenomonosilane and an organohalogenopolysilane having more silicon-silicon linkages in the compound than the starting organohalogenopolysilane.

The quaternary ammonium halides and the quaternary phosphonium halides useful in the practice of the present invention are those having the following formulae (5)         $(R')_4NX$ 

(6)         $(R')_4PX$ 

where R' may be the same or different alkyl radicals, e. g., methyl, ethyl, propyl, butyl, isobutyl, octyl, etc.; aryl radicals, e. g., phenyl, diphenyl, naphthyl, tolyl, xylyl, etc. radicals; and aralkyl radicals, e. g., benzyl, phenylethyl, etc. radicals, and X is halogen, e. g., chlorine, bromine, iodine, etc.

Included within the quaternary ammonium halides and quaternary phosphonium halides of the present invention may be mentioned, for example, tetramethyl ammonium chloride, benzyl trimethyl ammonium iodide, tetra-n-butyl ammonium chloride, phenyl trimethyl ammonium bromine, tetramethyl, phosphonium bromide, benzyl trimethyl phosphonium chloride, tetraethyl phosphonium iodide, etc.

In carrying out the process of the present invention, a wide variation in reaction conditions and reaction concentrations is allowable. The reaction is carried out by merely mixing the organohalogenopolysilane with a catalytic amount of either a quaternary ammonium halide or quaternary phosphonium halide or mixtures of these two quaternary compounds. The mixture is then heated at any desirable temperature until the degradation or redistribution reaction has been completed. We have found that suitable concentrations of the quaternary compound in the organohalogenopolysilane comprises from about 0.5 to 10 percent by weight of said quaternary compound based on the weight of the organohalogenopolysilane. Preferably we employ about 5 percent by weight of the quaternary compound based on the weight of the organohalogenopolysilane.

As with most chemical reactions, the reaction of the present invention proceeds at a more rapid rate at elevated tempeartures than at low temperatures. For this reason, we prefer to conduct our reaction at temperatures of from 50 to 150° C. Since agitation of any reaction mixture is advantageous, we preferably carry out our reaction at the reflux temperature of the reaction mixture since this provides very satisfactory agitation at a temperature at which the reaction proceeds at a rapid rate. In general, we have observed that the initial reflux temperature of our reaction mixtures are on the order of from 125 to about 150° C. During the course of the reaction, the reflux temperature begins to drop as cleavage or redistribution takes place and the percentage of organohalogenomonosilanes in the reaction mixture increases. By the process of the present invention, we are able to obtain conversions or redistribution of the starting organohalogenomonosilane in the range of from about 45 to 85 percent conversion of the initial organohalogenopolysilanes to organohalogenomonosilanes.

In order that those skilled in the art may better understand the practice of the present invention, the following examples are given by way of illustration and not by way of limitation.

In all of the following examples, the organohalogenopolysilane employed consisted of a mixture of methylchloropolysilanes obtained by passing methylchloride over heated silicon in the presence of a copper catalyst in the manner disclosed in the aforementioned Rochow patent to give a fraction comprised essentially of a mixture of compounds embraced by the aforementioned Formula 2 where R is a methyl group and $n$ has an average value of about 4. This mixture of compounds comprises a high boiling fraction (the bulk of it boiling from about 125–175° C.), and is composed for the most part of large amounts of dimethyltetrachlorodisilane (including its various isomers such as for instance, 1,1-dimethyl-1,2, 2,2-tetrachlorodisilane and 1,2-dimethyl-1,1,2,2-tetrachlorodisilane) and trimethyltrichlorodisilane (including its various isomers), as well as small amounts of methylpentachlorodisilane and the tetramethyldichlorodisilane (including its isomers). Also present in the mixture of methylchlorodisilanes are small amounts of methylchloromonosilanes, methyldisiloxanes, and methyl-substituted disilylalkylene, e. g., disilylmethylene compounds. However, about 70 to 80 percent of this high boiling residue comprises a mixture of methylchlorodisilanes as well as small amounts of hexachlorodisilane. For purposes of brevity, this methylchlorodisilane mixture will be hereinafter referred to as "mixture of methylchlorodisilanes."

*Example 1*

A mixture of 98 grams of the mixture of methyl-chlorodisilanes and 4.5 grams of tetramethyl ammonium chloride was placed in a reaction vessel connected to a reflux column and was heated at its reflux temperature. This reflux temperature initially corresponded to a reaction vessel temperature of 153° C. and gradually dropped to a reaction vessel temperature of 119° C. and remained at this lower temperature. As soon as the reaction vessel temperature reached the steady value of 119° C., the reaction was stopped and the reaction mixture was distilled. This distillation resulted in a mixture of 44.8 grams of a mixture of trimethylchlorosilane, dimethyldichlorosilane, and methyltrichlorosilane. Examination of this mixture of methylchlorosilanes showed the composition to be 20 percent by weight of trimethylchlorosilane, 40 percent by weight of dimethyldichlorosilane, and 40 percent by weight of methyltrichlorosilane.

*Example 2*

Following the procedure of Example 1, 6.0 grams of tetraethyl phosphonium iodide was added to 100 grams of the mixture of methylchlorodisilanes in a reaction vessel. This reaction mixture was then heated at its reflux temperature which was initially 153° C. and dropped gradually to 118° C. At this time, the reaction mixture was fractionally distilled and the fraction (28.2 g.) boiling from 58.5 to about 68° C. was collected. The infrared spectrum of this material corresponded to a mixture of methylchlorosilanes and the hydrolyzable chlorine amounted to 57.6 percent.

*Example 3*

By the procedure of Example 1, 10 grams of benzyl trimethyl ammonium iodide is added to 100 grams of the mixture of methylchlorodisilanes in a reaction vessel and heated at reflux temperature until the reflux temperature drops to a steady value. The reaction mixture is then fractionally distilled and the fraction boiling from about 55 to about 65° C. comprises a mixture of trimethylchlorosilane, dimethyldichlorosilane, and methyltrichlorosilane.

In addition to the mixture of methylchlorodisilanes employed in the examples, other organohalogenopolysilanes may be employed, including those organohalogenopolysilanes containing more than two silicon atoms joined by silicon-silicon linkages as well as organohalogenopolysilanes containing organo groups other than methyl, e. g., ethyl, propyl, butyl, phenyl, diphenyl, chlorophenyl, naphthyl, etc.

Furthermore, quaternary ammonium halides and quaternary phosphonium halides other than those specifically described in the example may be employed in the process. And the concentration of the quaternary compound based on the concentration of the organohalogenopolysilane may also differ from those specifically described in the examples. It is also obvious that instead of conducting the present reaction at reflux temperature, the reaction temperature may be below or above the reflux temperature. Where the reaction temperature is below the reflux temperature it is desirable to provide external agitation to the reaction mixture so as to obtain a desirable reaction rate. Where the reaction temperature is greater than the reflux temperature of the reaction mixture, the reaction must be carried out in pressure apparatus to avoid loss of reactants.

Although no particular advantage is obtained by employing a solvent in the reaction of the present invention, the use of solvents is not precluded. Thus, the solvents which may be employed include, for example, benzene, toluene, chlorobenzene, etc.

The organohalogenomonosilanes obtained in accordance with our invention from the organohalogenopolysilanes may be employed for various purposes. Thus, the former may be used in making organopolysiloxane resins of the type more particularly described and claimed in Rochow Patents 2,258,218—222. In addition, these organohalogenomonosilanes can be used to make useful lubricating organopolysiloxane oils (as is more particularly disclosed in Patnode Patents 2,469,888 and 2,469,890), or organopolysiloxane gums and vulcanized, filled products may be prepared therefrom.

What we claim as new and desire to secure by Letters Patent of the United States is:

1. The process for obtaining organohalogenomonosilanes in which the four valences of silicon are satisfied by halogeno and organo radicals from organohalogenopolysilanes in which the organo groups are monovalent hydrocarbon radicals attached directly to silicon by carbonsilicon linkages, which comprises treating said organohalogenopolysilanes with from 0.5 to 10 percent by weight, based on the weight of said organohalogenopolysilanes, of a quaternary halide selected from the class consisting of quaternary ammonium halides having the formula $$(R')_4NX$$

and quaternary phosphonium halides having the formula $$(R')_4PX$$

where R' is a member selected from the class consisting of alkyl and aryl radicals and X is halogen.

2. The process for obtaining methylchloromonosilanes in which the four valences of silicon are satisfied by methyl and chloro groups from methylchloropolysilanes which comprises heating said methylchloropolysilanes in the presence of from 0.5 to 10 percent by weight, based on the weight of said methylchloropolysilanes, of a quaternary compound selected from the class consisting of quaternary ammonium halides having the formula $$(R')_4NX$$

and quaternary phosphonium halides having the formula $$(R')_4PX$$

where R' is a member selected from the class consisting of alkyl and aryl radicals and X is halogen.

3. The process for obtaining a mixture of methyltrichlorosilane, dimethyldichlorosilane, and trimethylchlorosilane from methylchloropolysilanes which comprises heating said methylchloropolysilanes in the presence of from 0.5 to 10 percent by weight, based on the weight of said methylchloropolysilanes, of a quaternary ammonium halide having the formula $$(R')_4NX$$

where R' is a member selected from the class consisting of alkyl and aryl radicals, and X is halogen.

4. The process of claim 3 in which the quaternary ammonium halide is tetramethyl ammonium chloride.

5. The process for obtaining a mixture of methyltrichlorosilane, dimethyldichlorosilane and trimethylchlorosilane from methylchloropolysilanes which comprises heating said methylchloropolysilanes in the presence of from 0.5 to 10 percent by weight, based on the weight of said methylchloropolysilanes, of a quaternary phosphonium halide having the formula $$(R')_4PX$$

where R' is a member selected from the class consisting of alkyl and aryl radicals, and X is halogen.

6. The process of claim 5 in which the quaternary phosphonium halide is tetraethyl phosphonium iodide.

References Cited in the file of this patent

UNITED STATES PATENTS

| 2,598,434 | Mohler et al. | May 27, 1952 |
| 2,598,435 | Mohler et al. | May 27, 1952 |
| 2,709,176 | Bluestein | May 24, 1955 |